(12) United States Patent
Jin

(10) Patent No.: US 9,342,627 B2
(45) Date of Patent: *May 17, 2016

(54) DETERMINING WORD INFORMATION ENTROPIES

(71) Applicant: Alibaba Group Holding Limited, George Town (KY)

(72) Inventor: Kaimin Jin, Hangzhou (CN)

(73) Assignee: Alibaba Group Holding Limited (KY)

( * ) Notice: Subject to any disclaimer, the term of this patent is extended or adjusted under 35 U.S.C. 154(b) by 17 days.

This patent is subject to a terminal disclaimer.

(21) Appl. No.: 14/024,431

(22) Filed: Sep. 11, 2013

(65) Prior Publication Data

US 2014/0074884 A1 Mar. 13, 2014

Related U.S. Application Data

(63) Continuation of application No. 12/932,643, filed on Mar. 1, 2011, now Pat. No. 8,566,303.

(30) Foreign Application Priority Data

Mar. 8, 2010 (CN) .......................... 2010 1 0120564

(51) Int. Cl.
G06F 17/30 (2006.01)
(52) U.S. Cl.
CPC .... G06F 17/30979 (2013.01); G06F 17/30684 (2013.01)

(58) Field of Classification Search
CPC ................ G06F 17/30864; G06F 17/30867; G06F 17/30067; G06F 17/30979; G06F 17/30684
USPC ....................................... 707/705
See application file for complete search history.

(56) References Cited

U.S. PATENT DOCUMENTS

| | | | |
|---|---|---|---|
| 2003/0113017 A1* | 6/2003 | Thomas et al. ............... | 382/181 |
| 2003/0172084 A1* | 9/2003 | Holle ............................ | 707/101 |
| 2007/0250501 A1* | 10/2007 | Grubb et al. .................. | 707/5 |
| 2008/0077570 A1* | 3/2008 | Tang et al. .................... | 707/5 |
| 2012/0158703 A1* | 6/2012 | Li et al. ........................ | 707/723 |

FOREIGN PATENT DOCUMENTS

CN 101510221 8/2009

* cited by examiner

*Primary Examiner* — Leslie Wong
(74) *Attorney, Agent, or Firm* — Van Pelt, Yi & James LLP

(57) ABSTRACT

Determining and using word information entropies includes: determining one or more categories that correspond to a plurality of queries; sorting the plurality of queries into one or more groups based at least in part on the determined categories of the plurality of queries; segmenting queries that correspond to each of the one or more groups into a first plurality of phrases, wherein each phrase includes one or more words; determining occurrence probabilities for the plurality of phrases; and determining word information entropies for the plurality of phrases based at least in part on the determined occurrence probabilities.

18 Claims, 5 Drawing Sheets

DETERMINING WORD INFORMATION ENTROPIES

CROSS REFERENCE TO OTHER APPLICATIONS

This application is a continuation of co-pending U.S. patent application Ser. No. 12/932,643, entitled DETERMINING WORD INFORMATION ENTROPIES filed Mar. 1, 2011 which is incorporated herein by reference for all purposes; which claims priority to People's Republic of China Patent Application No. 201010120564.0 entitled METHOD AND DEVICE FOR DETERMINING WORD INFORMATION ENTROPY AND SEARCH METHOD AND DEVICE USING WORD INFORMATION ENTROPY filed Mar. 8, 2010 which is incorporated herein by reference for all purposes.

FIELD OF THE INVENTION

The present invention relates to the field of computer networks and particularly to using word information entropies for performing searches.

BACKGROUND OF THE INVENTION

In the context of using a search engine, a user describes information that he wishes to retrieve in the form of a text-based query. Typically, the search engine searches a database according to the information described in the query and returns one or more search results for the user. Statistical analysis shows that, on average, a query (e.g., "silk one-piece dress", "mobile phone", etc.) input by a user consists of 2.4 words. In general, the query input from the user is in the form of natural or informal text (e.g., incomplete sentences, sentences without correct punctuation) instead of a statement including "and", "or", "non-", etc. Therefore, the search engine has to determine the actual intent of the user based on the content of the query, perform a search, and return the search result to the user.

As used herein, word information entropy refers to the measurement of correlation between the length of certain text content and its certainty in describing a user's intent. For example, a significant amount of information is usually needed to clarify an uncertain concept or something without much known information, and less information is usually needed to clarify something that is already known to some extent. In this respect, it can be said that the measurement of information content is equivalent to the extent of uncertainty. Therefore, information content in a query may be represented by the concept of word information entropy, such that the real intent of the user may be determined according to the word information entropy associated the query to aid in performing a search based on that query.

Typically, word information entropy is calculated with the formula of TF/IDF, in which TF represents the total times that a word occurs in a set of documents and IDF represents the number of those documents in the set of documents that include the word. A larger value of TF/IDF calculated for a word indicates that the word is of relatively higher importance, and a smaller of TF/IDF calculated for a word indicates that the word is of relatively lower importance.

TF/IDF may be used to calculate word information entropy for a long text (e.g., a document with a large number of words). A query typically comprises a short text. Since a query contains only 2.4 words on average, and a query seldom includes more than one occurrence of a word, the words in the query are less likely to be distinguished in terms of importance by the word information entropies as calculated in the formula of TF/IDF. For example, for a query of "new mobile phone", the common modifier word "new" and the words "mobile phone" cannot be adequately distinguished in terms of importance according to the word information entropies as calculated by the existing formula of TF/IDF.

BRIEF DESCRIPTION OF THE DRAWINGS

Various embodiments of the invention are disclosed in the following detailed description and the accompanying drawings.

DETAILED DESCRIPTION

Figure 1:
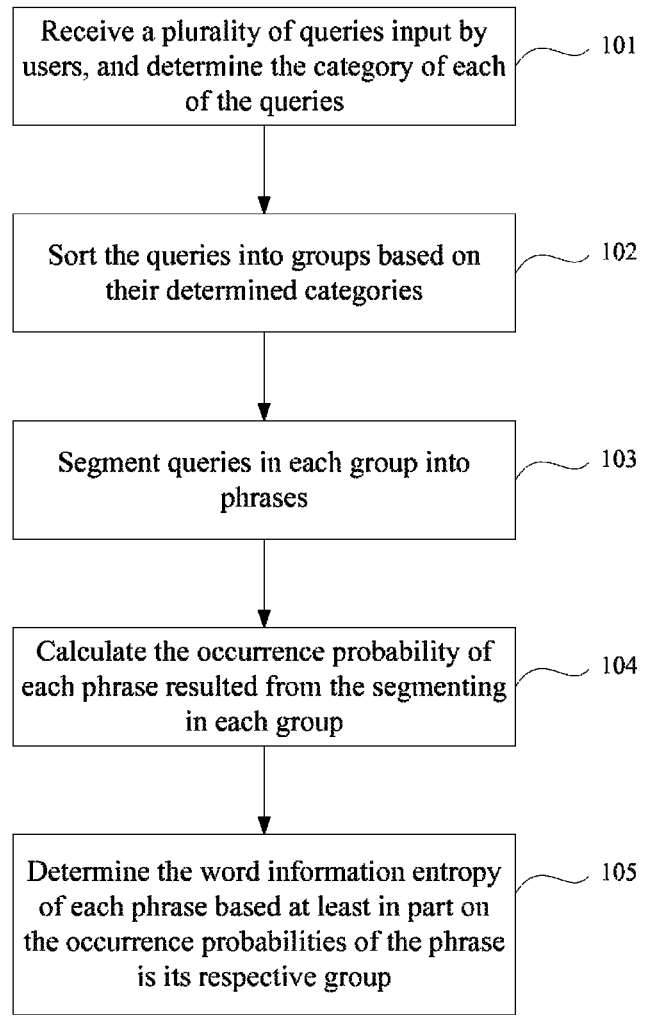
FIG. 1 is a flowchart showing an embodiment of a process for determining word information entropies.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Determining word information entropy and using word information entropy in searching are disclosed. As used herein, word information entropy relates to the degree of uncertainty in determining the meaning of a phrase for purposes of search. In various embodiments, high word information entropy for a phrase in a query indicates that the phrase is less useful in returning relevant search results for the query and so the phrase is of lower importance to the query. Low word information entropy for a phrase indicates that the phrase is more useful in returning relevant search results for the query and so the phrase is of higher importance to the query. In various embodiments, queries input by users of a search engine are collected. The collected queries are assigned categories and sorted into groups based on their assigned categories. The collected queries are also segmented into phrases for each group. Word information entropy is determined for each phrase. In various embodiments, correspondence relationships between the phrases and their respective word information entropies are stored.

In various embodiments, the stored correspondence relationships are used in conducting searches. In some embodiments, when a closely matching search result cannot be found/returned for a query, the query is segmented into phrases and a new search is performed based on less than all the phrases of the query. The phrases for the new search are selected for being relatively more important as based on their respective word information entropies as found within the stored correspondence relationships between phrases and word information entropies.

FIG. 1 is a flowchart showing an embodiment of a process for determining word information entropies. Process 100 may be performed on a system such as 300, which is described in greater detail later. As shown in the example, the process starts at 101, where queries input by users are received and their respective categories are determined.

In some embodiments, a query input by a user is a short text including 2 to 3 words on average. In various embodiments, the query is input into a search engine.

Two examples of methods for determining the category of a query are described.

In the first example, the category of a query is automatically determined using webpage information that is associated with the query. The category of a query may be determined by the category of a webpage that is linked to a search result (e.g., in the form of a hyperlink) returned by a search engine in response to the input query. In some embodiments, each target webpage is categorized by the search engine during a previous crawl of webpages and so the category of the query is deemed to be the same as the already determined category of a target webpage in the search results.

In the second example, the category of a query is determined using a preset correspondence relationship. For example, the category of a query is determined based on a category corresponding to a word in the query based on a preset correspondence relationship (e.g., set by a user or operator of the server) between that category and the word.

In some embodiments, a query may belong to one or more categories, depending upon the way that categories are defined. For example, if categories of products include a "category of mobile phone" and a "category of battery", then a query with the content of "battery of mobile phone" is categorized into both "category of mobile phone" and "category of battery". Also for example, if categories of products include a "category of mobile phone" but not a "category of battery", then the query with the content of "battery of mobile phone" is categorized into only the "category of mobile phone".

At 102 of process 100, the queries are sorted into groups based on their determined categories.

In other words, queries of the same determined category are sorted into the same group. In some embodiments, a query that is categorized into more than one category can be sorted into each of those categories.

In some embodiments, the queries included in each group may be regarded as a "large text" carrying information content of the queries. In some embodiments, the word information entropy of each phrase in a query may subsequently be calculated based on this "large text" (e.g., set of queries within a group).

At 103, queries in each group are segmented into phrases.

In various embodiments, segmenting a query into phrases involves dividing the content of the query into phrases based on the meanings of the phrases or words within the query (e.g., separating the words of a query into phrases or groups of words based on discernable meanings of the phrases/groups of words). In various embodiments, a phrase may be one or more string of words. For example, a query with the content of "new mobile phone" may be segmented into two phrases of "new" and "mobile phone".

In some embodiments, the queries in each group are segmented into phrases that are associated with or correspond to that group. Put another way, in some embodiments, the queries sorted into each group are segmented into a set of phrases that is associated with or correspond to the group. In some embodiments, the group with which a segmented phrase is associated plays a role in calculating the occurrence probability (and ultimately the word information entropy) of the phrase.

At 104, the occurrence probability of each phrase resulted from the segmenting of groups is determined.

In various embodiments, the occurrence probability of a phrase (e.g., in a set of phrases associated with a group) may be calculated by formula (1). In various embodiments, the occurrence probability of a phrase in its group (e.g., the group from which it was segmented) is obtained by dividing the number of times that the phrase occurs in the group of queries by the number of times that the word occurs in all the groups of queries. Formula (1) is as follows:

$$P_i = \frac{x_i}{y}, \qquad (1)$$

where $P_i$ represents the occurrence probability of a phrase in the $i^{th}$ group, $x_i$ represents the times that the phrase occurs in the $i^{th}$ group, y represents the times that the phrase occurs in all groups, and $1 \leq i \leq N$, where N represents the number of groups obtained from the sorting (e.g., step 102).

At 105, the word information entropy of each phrase is determined based at least in part on the occurrence probabilities of the phrase in its respective group.

In various embodiments, the word information entropy of a phrase is determined by formula (2):

$$\text{Entropy} = -\sum_{i=1}^{N} (P_i \times \log_2 P_i), \qquad (2)$$

where Entropy represents the word information entropy of a phrase, $P_i$ represents the occurrence probability of the phrase in the $i^{th}$ group, and N represents the number of groups obtained from the sorting.

A larger word information entropy of a phrase indicates that the phrase is of relatively lower importance in a query and a smaller word information entropy of a phrase indicates that the phrase is of relatively greater importance in the query.

In some embodiments, a correspondence relationship between the determined word information entropy of a phrase and the phrase may be stored in a storage device such as a hard disk or a memory. In some embodiments, the stored word information entropy of each phrase may also be updated in real time or periodically (e.g., as more word information entropies are calculated). These stored correspondence relationships between the determined word information entropies and phrases may also be associated with a search engine such that the search engine may refer to the stored relationships in performing subsequent searches.

In some embodiments, after the word information entropies of phrases in queries are determined, the following steps of updating the word information entropies may be performed for subsequent queries that are input by users.

The category of each subsequent query input by a user is determined, and the subsequently input queries are sorted into groups based on their determined categories. The recently sorted groups of queries and those groups that were previously sorted are combined together. The subsequent input queries are segmented into phrases, and the occurrence probability of each phrase in each of the combined groups is calculated. The word information entropy of each phrase is re-determined or updated based on the occurrence probability of the phrase in its respective newly updated group.

For example, when users input L number of queries at a time t1, the L queries are each assigned one or more categories and then sorted into M number of groups based on the determined categories of the queries. In some embodiments, each group corresponds to a category and multiple queries may correspond to the same category. Next, queries in all the groups are segmented and N number of phrases are determined from the word segmentation. Subsequently, the occurrence probabilities of the N phrases in each group are calculated; and the word information entropy of each of the N phrases is determined based in part on its calculated occurrence probability.

When users subsequently input l number of queries at time t2 (t2 occurs later than time t1), the l queries are each assigned one or more categories and sorted into m number of groups according to their categories. The current m groups and the previous M groups are then combined. In some embodiments, since the current m groups and the previous M groups may include one or more groups identical in content, only one of the groups identical in content needs to be maintained. Next, the l subsequent input queries are segmented, and n number of phrases is determined from the word segmentation. Subsequently, the occurrence probability of each phrase in each of the combined groups is re-calculated, and the word information entropy of each phrase is re-determined according to the occurrence probability of the phrase in its respective group. As such, the word information entropies are updated and the results can be stored into one or more storage devices. Note that in this example, L, M, N, l, m and n are positive integers, and L and l, M and m, or N and n may be of an identical value or different values.

The word information entropies can be updated at various frequencies. In some embodiments, it is not necessary to update the word information entropies per each subsequent query input by a user. Instead, the word information entropies may be updated when there are a large number of input queries within a short span time or the updating has not been performed for a long span of time. In some embodiments, the frequency at which the word information entropies is updated depends on the availability of system resources needed to perform such an update. The following are two examples of when or how frequent word information entropies can be updated:

The first example involves updating the word information entropies every time a preset threshold number of queries have been input by one or more users. When users input subsequent queries after a set of word information entropies has already been determined (e.g., after the word information entropies have been determined for the first time or have already been subsequently updated at least once), the subsequent input queries are collected and the total number of queries is determined (e.g., by using a reference count that increments every time a subsequent query is input). Then, it is determined whether the total number of the queries has reached a preset threshold. If so, it indicates that there is a large enough number of queries input by users and an update of the word information entropies at this point is meaningful (e.g., is likely to accurately reflect the importance of each word). Therefore, the word information entropies are updated according to the newly collected subsequent queries. Either during or after the updating occurs, the indicator for the total number of subsequent queries that have been used for the recent update is set to zero (e.g., the reference count is reset to a value of zero). The process repeats where subsequent queries input by users are collected and the number of the subsequent input queries are totaled. Otherwise, if the total number of subsequent input queries does not reach the preset threshold, the updating procedure does not start until preset threshold is eventually reached.

The second example involves updating the word information entropies at set time intervals. When users input subsequent queries after a set of word information entropies has already been determined (e.g., after the word information entropies have been determined for the first time or have already been subsequently updated at least once), the subsequent input queries are collected, and it is determined whether a preset period of time has passed (e.g., since the previous determination of word information entropies or the last update). The time passed can be determined using a timer that resets during or after each determination or update of word information entropies. If the preset period of time has passed, then the word information entropies are updated according to the queries collected during the preset period of time. Otherwise, if the preset period of time has not passed, then the updating procedure does not start until the preset period of time has passed. For instance, assume that the preset period of time is 24 hours and the timer starts from midnight each day. If the word information entropies are previously updated at midnight one day, subsequent queries input by a user are collected until midnight of the next day. Then the word information entropies are updated based on the queries collected during the previous 24 hours (i.e., the preset period of time).

Process 100 may be used to determine the importance of the word in the query and such determinations can help improve the quality and/or relevance of returned search results. Process 100 may be applicable to a service such as a query service or an auction service. In an example with respect to a query service, in the event that there is a relatively long query for which closely matching search results cannot be found, a result matching to one or more phrases of the query that are deemed to be relatively more important (e.g., as determined by their respective word information entropies using process 100) is returned instead. In an example with respect to the auction service, a relatively less important phrase (e.g., as determined by its respective word information entropy using process 100) can be removed from a query altogether and the search is instead conducted based on the remaining relatively more important phrases of the query.

Figure 2:
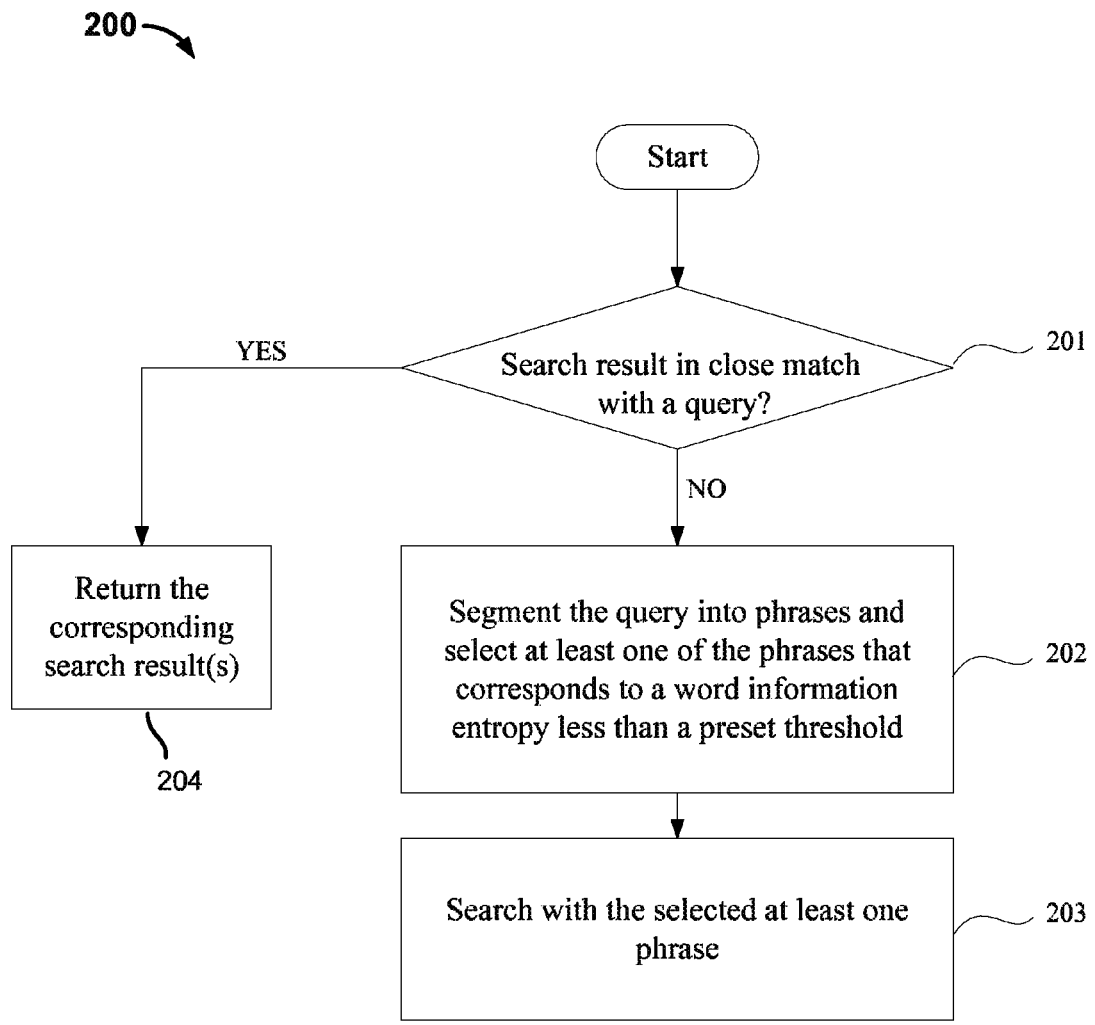
FIG. 2 is a flowchart showing an embodiment of a searching process based at least in part on word information entropies.

FIG. 2 is a flowchart showing an embodiment of a searching process based at least in part on word information entropies. Process 200 may be implemented on a system such as 300 of FIG. 3.

At 201, it is determined whether there is a search result that closely matches a query. In various embodiments, the query is input by a user. In various embodiments, the query is received by a search engine (e.g., via a search field). In some embodiments, whether a search result closely matches a query is determined based on a predetermined set of rules. The predetermined set of rules may yield a percentage match between each search result and the entire query. A threshold percentage may be selected such that a match percentage above that threshold indicates that a search result closely matches the query. If none of the search results returned for the entire query can be deemed a close match, then there are no search results that closely match the query.

In some embodiments, if there is at least one search result that closely matches with the query (e.g., a search result that matches with the query as a whole), then these search results are returned to the user in step 204. Otherwise, if there is not one search result that closely matches with the query, then step 202 is performed.

In some embodiments, the previously received queries are already processed by process 100 such that previously received queries are already sorted into groups based on their respectively assigned categories. Also the previously received queries were segmented into phrases within their respective groups and the word information entropy of each phrase was determined based on its occurrence probability. Then, the relationships between phrases and their corresponding word information entropies were stored in a storage device. The word information entropies may have also been updated at least once if a preset condition had been met.

At 202, the query is segmented into phrases and at least one of the phrases corresponding to word information entropy less than a preset threshold is selected. In some embodiments, the phrase is selected based at least in part on the stored relationships of word information entropies corresponding to phrases.

In some embodiments, stored correspondence relationships between the phrases and their respective word information entropies determined from previously input queries can be used to determine which word in the query is of relatively higher importance. As mentioned above, a higher word information entropy correlates to less importance and a lower word information entropy correlates to greater importance. In some embodiments, the preset threshold of word information entropy may be set by an operator. In various embodiments, each segmented phrase of the query is looked up in the stored relationships between phrases and their respective word information entropies. When a phrase is found within the stored information, its respective word information entropy is stored (or temporarily stored). After the respective word information entropies for each segmented phrase of the query have been found among the stored information, one of the phrases whose word information entropy is less than the preset threshold is selected. In some embodiments, if there are multiple phrases whose word information entropies are less than the preset threshold, then the phrase whose respective word information entropy is farthest below the preset threshold is selected (e.g., based on its word information entropy, this phrase is relatively the most important). In some embodiments, if there are multiple phrases whose word information entropies are less than the preset threshold, then all such phrases are selected (e.g., based on their word information entropies, all these phrases are deemed to be important for having exceeded the preset threshold).

In some embodiments, process 100 may be performed before step 201, or at any time between the steps 201 and 202.

At 203, a search is performed using the selected at least one phrase whose word information entropy is less than the preset threshold.

The selected phrase is considered to be relatively more important. Because there is a lack of a closely matching result to the entire query as determined in step 201, the search is refocused using a portion of the query that is considered to be important, which is the selected phrase(s). Since only the selected phrase(s) is used in the search in step 203, the unselected phrases of the query are essentially discarded (e.g., not used by the search engine when searching for results for the query). This is so that they do not distract the search engine from finding results that are presumably less relevant to the intent of the user who input the query. In some embodiments, the results found using the selected phrase(s) are returned and displayed for the user.

In some embodiments, if a query includes at least three words and there is no search result that closely matches the query, then the words in the query may be ranked in an ascending order of word information entropies. The one or more of the words with word information entropy smaller than a preset threshold may be selected to base a new search upon. For example, if word1 and word3 in the query (e.g., including word1, word2 and word3) each have word information entropy smaller than the preset threshold, then a search may be performed by using the word1 or the word3 or both (but not using word2).

Processes 100 and 200 may be performed on a hadoop distributed platform to improve the speed of processing the data. A distributed platform may consist of a plurality of servers, e.g., more than 100 servers each with a memory of 8G.

The following is an example of applying process 100 and process 200:

Initially, categories 1, 2, . . . , n of input queries are determined (e.g., by an operator). Queries 1 to n are input (e.g., into a search engine). Specifically, two of the queries are "new mobile phone" and "new one-piece dress." Queries 1 to n are sorted into groups based on their determined categories. The query of "new mobile phone" is determined to be of a category of "mobile phone", and the query of "new one-piece dress" is determined to be of a category of "dress". The query of "new mobile phone" is sorted to group 1 (corresponding to the category of "mobile phone"), and the query of "new one-piece dress" is put to group 2 (corresponding to the category of "dress").

The occurrence frequency of each query in the respective groups is determined. This may be represented as D={<Q1, QC1>, <Q2, QC2> . . . }, where D represents a group, Q1 represents a query, and QC1 represents the number of queries in the group D which are identical to the query Q1. For example, $D_{mobile\ phone}$={<new mobile phone, 1>}; and $D_{dress}$={<new one-piece dress, 1>}.

Queries in each group are segmented into phrases, and then these phrases are included in the group of their respective queries. For example, the query "new mobile phone" in group 1 is segmented into the phrases "new" and "mobile phone", and the query "new one-piece dress" in group 2 is segmented into the phrases "new" and "one-piece dress".

The occurrence frequency of each segmented phrase within its respective group is determined. This may be represented as D={<W1, WC1>, <W2, WC2> . . . }, where D represents a group, W1 represents a phrase, and WC1 represents the number of phrases in the group D which are identical to phrase W1. For example, $D_{mobile\ phone}$={<new, 1>, <mobile phone, 1>}; and $D_{dress}$={<new, 1>, <one-piece dress, 1>}.

Then, the occurrence probability of each phrase in its respective group is calculated. This may be represented as D={<W1, WP1>, <W2, WP2> ... }, where D represents a group, W1 represents a phrase, and WP1 represents the occurrence probability of the phrase W1 in the group D, e.g., the quotient obtained from dividing the number of times that the phrase W1 occurs in the group D by the total number of times that the phrase W1 occurs in all groups. For example, the phrase "new" occurs once in the group of "mobile phone" and once in the group of "dress", and thus the occurrence probability of the phrase "new" in the group of "mobile phone" is 0.5 and in the group of "dress" is 0.5 (i.e., $D_{mobile\ phone}$={<new, 0.5>, <mobile phone, 1>}; and $D_{dress}$={<new, 0.5>, <one-piece dress, 1>}).

The word information entropy of each phrase can be calculated using the above information. For example, the word information entropy of each phrase can be calculated as follows:

$Entropy_{new} = -0.5 \times \log_2(0.5) - 0.5 \times \log_2(0.5) = 1$ $Entropy_{mobile\ phone} = -1 \times \log_2(1) - 0 \times \log_2(0) = 0$ $Entropy_{one\text{-}piece\ dress} = -1 \times \log_2(1) - 0 \times \log_2(0) = 0$ Since the phrases "mobile phone" and "one-piece dress" occur in only one of the groups, they are less indeterminate (e.g., more accurately reflect a user's intent behind the query) and have word information entropy of 0; while the phrase "new" occurs in both the groups, and they are more indeterminate and have word information entropy of 1.

As such, a correspondence relationship between each phrase and its calculated word information entropy is stored in a storage device.

Subsequently, when a user inputs a query "new mobile phone" to retrieve a search result, if it is determined that no search result that is a close match can be found, then the word information entropy of each of the phrases in the query "new mobile phone" is determined based on the stored correspondence relationships between phrases and their word information entropies. Since the word information entropy of the phrase "mobile phone" is the smallest, a new search is performed by using "mobile phone" as the query, and a search result is returned based on the query "mobile phone" (instead of "new mobile phone").

Figure 3:
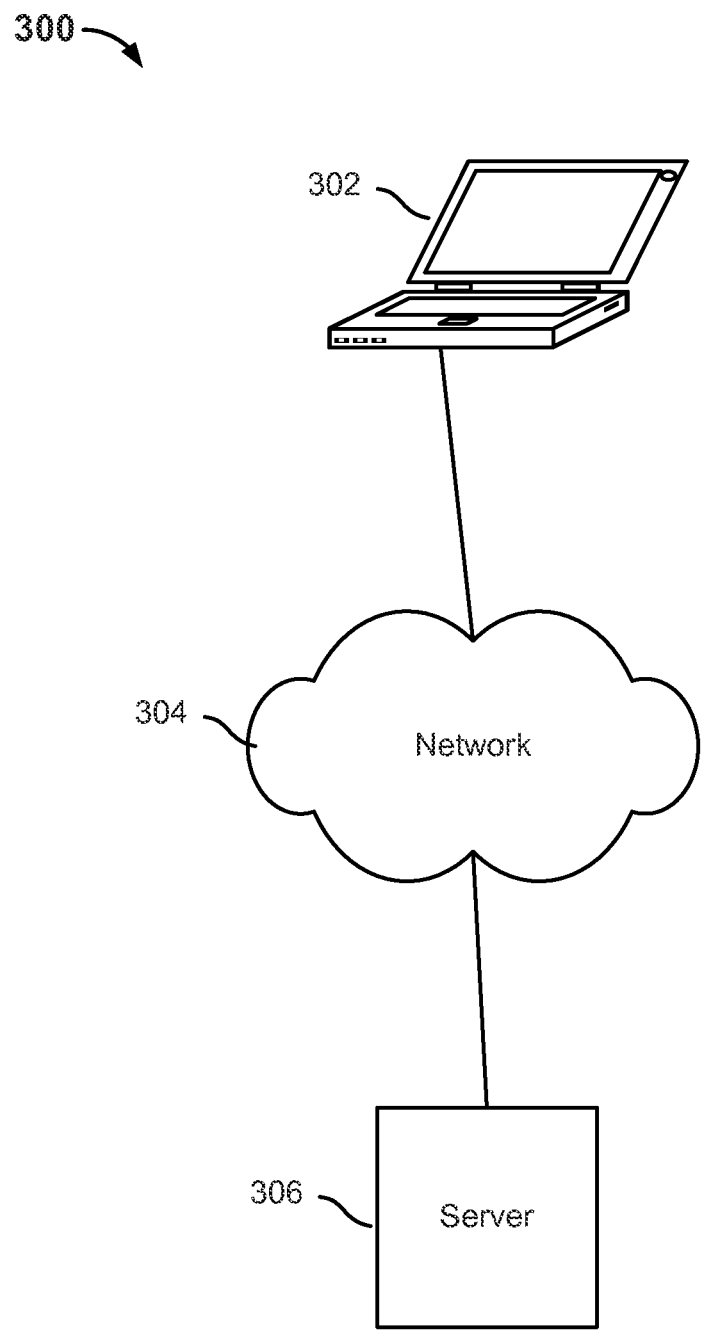
FIG. 3 is a diagram showing an embodiment of a system for determining and using word information entropies.

FIG. 3 is a diagram showing an embodiment of a system for determining and using word information entropies. System 300 includes user 302, network 304, and server 306. Network 304 includes various high speed data networks and/or telecommunications networks. In some embodiments, processes 100 and 200 may be performed using system 300. In some embodiments, server 306 is composed of one or more hardware devices and/or is implemented through software and/or logic.

Server 306 is configured to determine word information entropies based on received query inputs. In some embodiments, server 306 supports or is otherwise associated with a search engine service (e.g., associated with a particular electronic commerce platform). In various embodiments, server 306 receives queries input into a search engine by one or more users (e.g., user 302). Server 306 is configured to determine at least one category for each query and sort the queries into groups based on their determined categories. Server 306 is configured to segment the queries in each group into phrases.

In some embodiments, the queries are segmented into phrases based on discernable meanings of different phrases within the queries. Server 306 is configured to determine the occurrence probability of each phrase and subsequently the word information entropy of each phrase using at least logic programmed to perform the determinations. In some embodiments the logic is programmed by an operator of server 306. In various embodiments, the phrases and their respectively determined word information entropies (e.g., as correspondence relationships) are stored. In some embodiments, the correspondence relationships are stored on server 306 or in a separate storage that is accessible by server 306.

Server 306 is also configured to use determined word information entropies in searching. In some embodiments, server 306 is configured to access the stored correspondence relationships in searching. In some embodiments, server 306 does not find a close match to a certain query input (e.g., by user 302) into the search engine. In some embodiments, a close match is not found is indicated by a very small number of returned search results (e.g., the number of search results falls below a predetermined number). In some embodiments, a close match is not found when the user indicates by, for example, selecting a selectable option on the search engine display webpage that a further search needs to performed after the initial search results are returned. In some embodiments, a close match is not found is indicated by a low calculate match percentage between search results and the entire query. When this occurs, server 306 is configured to select one or more phrases of the query based on their associated word information entropies as looked up in the stored correspondence relationships. In some embodiments, the phrases with corresponding word information entropies below a preset threshold are selected (e.g., because they are deemed to be the more important phrases of the query). In some embodiments, the preset threshold is set by an operator of server 306. Server 306 is configured to conduct a new search based on only the selected phrases (e.g., the remaining phrases, if any, of the query are not used in this new search). Server 306 is also configured to display the returned search results to the user (e.g., user 302).

User 302 is a device through which a user inputs queries. While user 302 is shown as a laptop in FIG. 3, user 302 may also include any computer, mobile device, or tablet, among others. User 302 also displays search results returned from a query. In some embodiments, user 302 displays a webpage of a search engine and a user may enter a query into the search box as displayed on the webpage and view or interact with search results on the same webpage.

Figure 4:
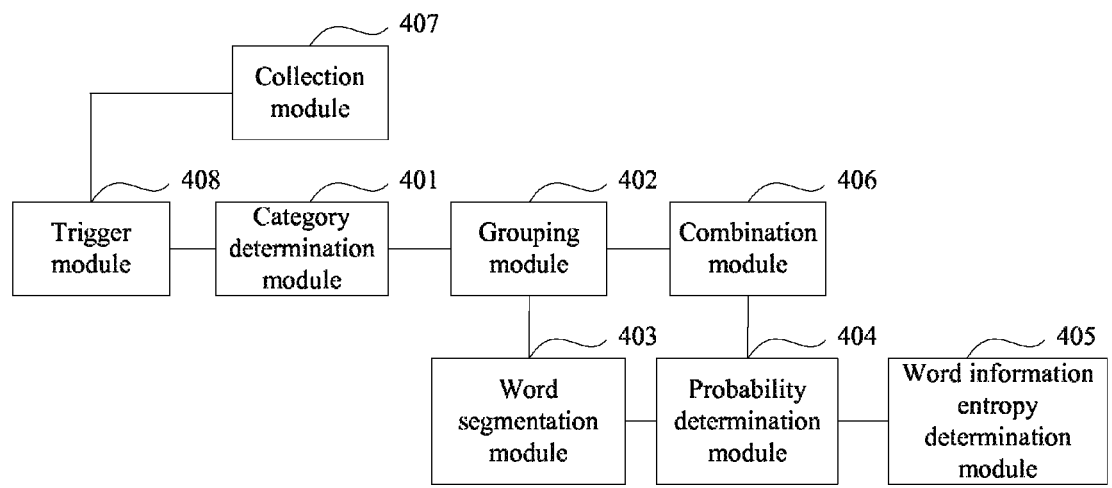
FIG. 4 is a diagram showing an embodiment for a system for determining and updating word information entropies.

FIG. 4 is a diagram showing an embodiment for a system for determining and updating word information entropies. System 400 includes category determination module 401, grouping module 402, word segmentation module 403, probability determination module 404 and word information entropy determination module 405. In some embodiments, system 400 may be used to implement server 306 of FIG. 3.

The modules can be implemented as software components executing on one or more processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipments, etc.) implement the methods described in the embodiments of the present invention. The modules may be implemented on a single device or distributed across multiple devices. The functions of the modules may be merged into one another or further split into multiple sub-modules.

Category determination module 401 is configured to determine the category of each query input by users. Grouping module 402 is configured to sort the queries into groups based on their determined categories. Word segmentation module 403 is configured to segment queries into phrases. Probability determination module 404 is configured to calculate the occurrence probability of each phrase (that is created as a result of segmentation) in each group. Word information entropy determination module 405 is configured to determine the word information entropy of each phrase based on the occurrence probability of the phrase in its respective group.

In some embodiments, word information entropy determination module 405 is configured to determine the word information entropy of a phrase using the following formula, for example:

$$\text{Entropy} = -\sum_{i=1}^{N} (P_i \times \log_2 P_i),$$

where Entropy represents the word information entropy of a phrase, $P_i$ represents the occurrence probability of the phrase in the $i^{th}$ group, and N represents the number of the groups obtained from the sorting.

Category determination module 401 is configured to perform at least two kinds of functions for determining the category of a query.

In the first kind of function, category determination module 401 is configured to determine a category of a webpage that is returned with the search results for a query and this category is determined to be the category of the query. In some embodiments, the webpages that are returned in the search results for a query must have already been categorized (e.g., by a search engine) at some earlier point in time.

In the second kind of function, category determination module 401 is configured to determine the category of a query based at least in part on a preset correspondence relationship between the category and a phrase or word within the query. In some embodiments, a set of preset correspondence relationships are stored in a storage that is accessible by category determination module 401. In some embodiments, preset correspondence relationships include the pairing of phrases with their respective categories (e.g., the phrase "mobile phone" is paired with the category of "telecommunications technology"). In some embodiments, the scope of a category is set or configured by an operator of category determination module 401.

Combination module 406 is configured to coordinate with the other modules to update word information entropies that are stored from a previous determination of word information entropy as follows:

Assuming that a previous determination of word information entropy has already taken place: category determination module 401 is configured to determine the category of each subsequent query input by a user. Grouping module 402 is configured to sort the subsequent input queries into groups based on their categories. Combination module 406 is configured to combine the groups of categories into which the subsequent input queries are sorted and the groups obtained in the previous sorting of queries (e.g., during the previous determination of word information). Word segmentation module 403 is configured to segment the subsequent input queries into phrases. Probability determination module 404 is configured to re-calculate the occurrence probability of each of the phrases in each of the combined groups. Word information entropy determination module 405 is configured to re-determine the word information entropy of each phrase based on the re-calculated occurrence probabilities of the phrases in their respective groups.

In some embodiments, word information entropies are updated when the number subsequent queries reaches a preset threshold. An example of implementing this kind of trigger for updating word information entropies using system 400 is as follows:

Collection module 407 is configured to collect subsequent (e.g., to previous determination of word information entropies) input queries and keep track of the total number of collected queries. Trigger module 408 is configured to trigger category determination module 401 when the total number of collected queries reaches a preset threshold.

In some embodiments, word information entropies are updated after a predetermined period of time has passed. An example of implementing this kind of trigger for updating word information entropies using system 400 is as follows:

Collection module 407 is configured to collect subsequent input queries. Trigger module 408 is configured to maintain the time passed since a previous determination of word information entropies. When the time exceeds a predetermined period of time, trigger module 108 is configured to trigger category determination module 401 to begin an update of the word information entropies. Once an update procedure begins, the time maintained by trigger module 408 resets back to zero.

Figure 5:
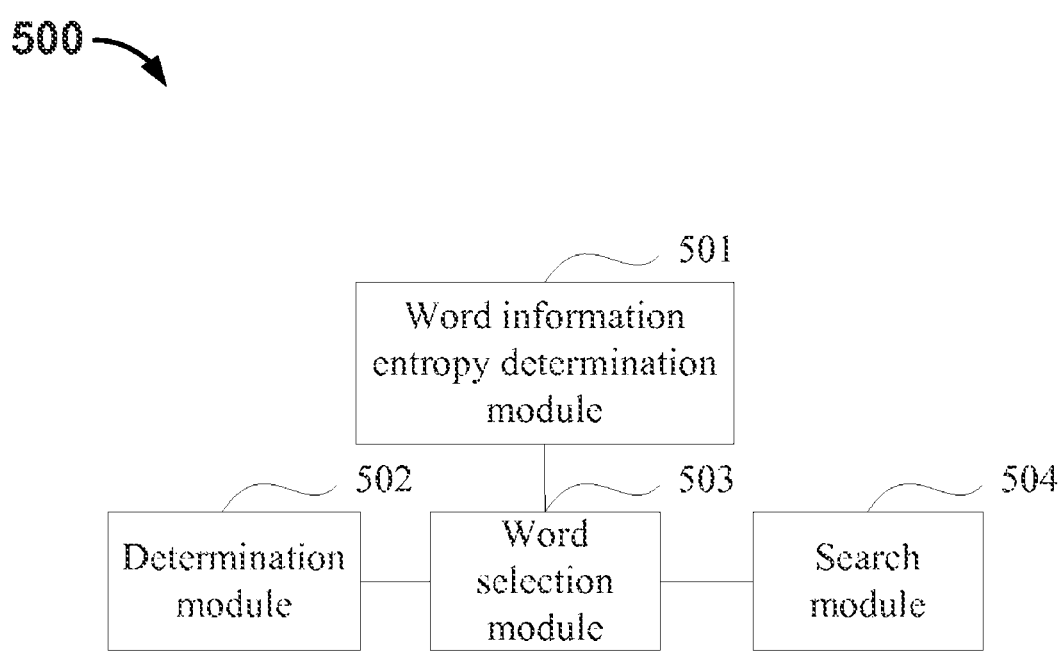
FIG. 5 is a diagram showing an embodiment of a system for searching with word information entropies.

FIG. 5 is a diagram showing an embodiment of a system for searching with word information entropies. In some embodiments, system 500 may be used to implement server 306 of FIG. 3.

System 500 includes word information entropy determination module 501, determination module 502, word selection module 503, and search module 504. In various embodiments, in system 500, word information entropy determination module 501 is implemented by system 400 of FIG. 4 but is integrated with a search engine function as represented by search module 504. In various embodiments, search module 504 is configured to be a search engine or as an interface that can access a search engine.

Besides word information entropy determination module 501 and search module 504, system 500 also includes determination module 502 and word selection module 503. Determination module 502 is configured to determine whether there is a search result that closely matches to a query input by a user. In some embodiments, when determination module 502 determines that there is no closely matching search result to return for the query, it triggers word selection module 503 to a select a phrase segmented from the query (e.g., because word information determination module 501 has already segmented the query into one or more phrases). In various embodiments, word selection module 503 is configured to select at least one phrase with word information entropy that is less than a preset word information entropy threshold from the phrases into which the query has been segmented. Search module 504 is configured to perform a new search using the selected phrase.

Those skilled in the art shall appreciate that embodiments of the invention may be embodied as a method, system, or computer program product. As such, the invention may be implemented in the form of a hardware embodiment, a software embodiment, or an embodiment combining both hardware and software. Further, the invention may be embodied in the form of a computer program product embodied on one or more computer readable storage media (including but not limited to a disk storage, a CD-ROM, an optical storage, etc.) including program codes executable by a computer.

In some embodiments, the flow diagrams may be implemented with computer program instructions. The computer program instructions may be provided for a processor of a general computer, a dedicated computer, an embedded processing machine, or other programmable data processing devices to produce a machine, so that the instructions executed by the processor of the computer or the other programmable data processing devices produce a means for performing a function(s) that is specified in the flow(s) of the flow diagrams.

Alternatively, these computer program instructions may be stored in a computer readable memory capable of directing the computer or other programmable data processing devices to operation in a specific way, to enable the instructions stored in the computer readable memory to produce an article of manufacture including an instruction means for performing a function(s) specified in the flow(s) of the flow diagrams.

Alternatively, these computer program instructions may be loaded onto the computer or the other programmable data processing devices, to enable a series of operations to be performed on the computer or the other programmable devices to implement computer-implemented operations.

Although the preferred embodiments of the invention have been described, those skilled in the art may make further variations and modifications to these embodiments in light of the inventive concept.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   one or more processors configured to:
     determine one or more categories that correspond to a plurality of queries;
     sort the plurality of queries into one or more groups based at least in part on the determined one or more categories of the plurality of queries;
     segment queries that correspond to each of the one or more groups into a first plurality of phrases, wherein each phrase includes one or more words;
     determine occurrence probabilities for the first plurality of phrases, the determined occurrence probabilities being computed based at least in part on a number of times a phrase occurs in a corresponding group and a number of times the phrase occurs across the one or more groups;
     determine word information entropies for the first plurality of phrases based at least in part on the determined occurrence probabilities, wherein a word information entropy relates to a degree of uncertainty for a corresponding phrase used in searching;
     perform a first search using a subsequent query, wherein the subsequent query includes a second plurality of phrases:
     determine that one or more search results found for the subsequent query do not meet a predetermined rule associated with search results being close matches to the subsequent query; and
     in response to the determination that the one or more search results returned for the subsequent query do not meet the predetermined rule associated with search results being close matches to the subsequent query:
       determine a first phrase of the second plurality of phrases of the subsequent query that is associated with a corresponding word information entropy that is less than a threshold value;
       determine a second phrase of the second plurality of phrases of the subsequent query that is associated with a second corresponding word information entropy that is equal to or greater than the threshold value;
       generate a new query that includes the first phrase and excludes the second phrase; and
       perform a second search using the new query; and
   one or more memories coupled to the one or more processors and configured to provide the one or more processors with instructions.

2. The system of claim 1, wherein a category for a query of the plurality of categories is determined based at least in part on a category associated with a webpage that is associated with a search result for the query.

3. The system of claim 1, wherein a category for a query of the plurality of categories is determined based at least in part on a preset correspondence relationship associated with a word in the query.

4. The system of claim 1, wherein to segment queries is based at least in part on phrase meanings.

5. The system of claim 1, wherein to determine occurrence probabilities for the first plurality of phrases includes to determine an occurrence probability of a phrase of a group from the one or more groups, wherein the occurrence probability of the phrase is determined based at least in part on dividing a number of times the phrase occurs in the group by a number of times that the phrase occurs across the one or more groups.

6. The system of claim 1, wherein the one or more processors are further configured to update the word information entropies based at least in part on an expiration of a predetermined period of time.

7. The system of claim 1, wherein the one or more processors are further configured to update the word information entropies based at least in part on receipt of a predetermined number of queries.

8. A method, comprising:
   determining one or more categories that correspond to a plurality of queries;
   sorting, using one or more processors, the plurality of queries into one or more groups based at least in part on the determined one or more categories of the plurality of queries;
   segmenting queries that correspond to each of the one or more groups into a first plurality of phrases, wherein each phrase includes one or more words;
   determining occurrence probabilities for the first plurality of phrases, the determined occurrence probabilities being computed based at least in part on a number of times a phrase occurs in a corresponding group and a number of times the phrase occurs across the one or more groups;
   determining word information entropies for the first plurality of phrases based at least in part on the determined occurrence probabilities, wherein a word information entropy relates to a degree of uncertainty for a corresponding phrase used in searching;
   performing a first search using a subsequent query, wherein the subsequent query includes a second plurality of phrases:

determining that one or more search results found for the subsequent query do not meet a predetermined rule associated with search results being close matches to the subsequent query; and in response to the determination that the one or more search results returned for the subsequent query do not meet the predetermined rule associated with search results being close matches to the subsequent query;

determining a first phrase of the second plurality of phrases of the subsequent query that is associated with a corresponding word information entropy that is less than a threshold value;

determining a second phrase of the second plurality of phrases of the subsequent query that is associated with a second corresponding word information entropy that is equal to or greater than the threshold value;

generating a new query that includes the first phrase and excludes the second phrase; and performing a second search using the new query.

9. The method of claim 8, wherein a category for a query of the plurality of categories is determined based at least in part on a category associated with a webpage that is associated with a search result for the query.

10. The method of claim 8, wherein a category for a query of the plurality of categories is determined based at least in part on a preset correspondence relationship associated with a word in the query.

11. The method of claim 8, wherein segmenting queries is based at least in part on phrase meanings.

12. The method of claim 8, wherein determining occurrence probabilities for the first plurality of phrases includes determining an occurrence probability of a phrase of a group from the one or more groups, wherein the occurrence probability of the phrase is determined based at least in part on dividing a number of times the phrase occurs in the group by a number of times that the phrase occurs across the one or more groups.

13. The method of claim 8, further comprising updating the word information entropies based at least in part on an expiration of a predetermined period of time.

14. The method of claim 8, further comprising updating the word information entropies based at least in part on receipt of a predetermined number of queries.

15. The method of claim 8, wherein the predetermined rule associated with search results being close matches to the subsequent query comprises a threshold percentage associated with a match percentage between a search result and the subsequent query.

16. A computer program product, the computer program product being embodied in a non-transitory computer readable storage medium and comprising computer instructions for:

determining one or more categories that correspond to a plurality of queries;

sorting the plurality of queries into one or more groups based at least in part on the determined one or more categories of the plurality of queries;

segmenting queries that correspond to each of the one or more groups into a first plurality of phrases, wherein each phrase includes one or more words;

determining occurrence probabilities for the first plurality of phrases, the determined occurrence probabilities being computed based at least in part on a number of times a phrase occurs in a corresponding group and a number of times the phrase occurs across the one or more groups;

determining word information entropies for the first plurality of phrases based at least in part on the determined occurrence probabilities, wherein a word information entropy relates to a degree of uncertainty for a corresponding phrase used in searching;

performing a first search using a subsequent query, wherein the subsequent query includes a second plurality of phrases;

determining that one or more search results found for the subsequent query do not meet a predetermined rule associated with search results being close matches to the subsequent query; and in response to the determination that the one or more search results returned for the subsequent query do not meet the predetermined rule associated with search results being close matches to the subsequent query:

determining a first phrase of the second plurality of phrases of the subsequent query that is associated with corresponding word information entropy that is less than a threshold value;

determining a second phrase of the second plurality of phrases of the subsequent query that is associated with a second corresponding word information entropy that is equal to or greater than the threshold value;

generating a new query that includes the first phrase and excludes the second phrase; and performing a second search using the new query.

17. The system of claim 1, wherein the predetermined rule associated with search results being close matches to the subsequent query comprises a threshold percentage associated with a match percentage between a search result and the subsequent query.

18. The computer program product of claim 16, wherein the predetermined rule associated with search results being close matches to the subsequent query comprises a threshold percentage associated with a match percentage between a search result and the subsequent query.

* * * * *